Patented Apr. 26, 1938

2,115,080

UNITED STATES PATENT OFFICE 2,115,080

PROCESS OF MAKING RED PIGMENT

James J. O'Brien, Dundalk, and Gordon M. Juredine, Baltimore, Md., assignors to The Glidden Company, Cleveland, Ohio, a corporation of Ohio No Drawing. Application February 11, 1935, Serial No. 6,126

8 Claims. (Cl. 134—58)

This invention relates to the cadmium selenium reds, and has particular reference to a new and novel method of producing these pigments, whereby the color is improved as to clarity and tone, and whereby the tinting strength of the red is increased.

The cadmium selenium reds are essentially cadmium sulfo-selenide. While the sulfide of cadmium is yellow, and the selenide is dark brown to black, the sulfo-selenide may be varied from a light orange to a rich maroon shade, by varying the sulfur-selenium ratio, if conditions of manufacture are carefully regulated. Small percentages of selenium give orange shades; higher percentages give the deeper shades. A ratio of about 1 part of selenium to about 4BaS gives about as deep a shade as it is possible to make in a pleasing clean color.

Several methods have been suggested for the preparation of these compounds; but we prefer the method outlined in the O'Brien Patent #1,894,931, granted January 17, 1933. Selenium is dissolved in barium or sodium sulphide liquor, depending on whether a lithopone type pigment, or a pure cadmium sulfo-selenide is desired. The solution is mixed with a cadmium sulfate solution (or other salt if a compound pigment is not desired); the strike may be sulfide liquor into sulfate, sulfate into sulfide, or the two liquors may be run into a tank simultaneously. The precipitate is filtered, washed, calcined, and then quenched, ground wet, dried and pulverized, as is common practice with other pigments.

We have found that superior results as to clarity of color may be obtained if the solution of selenium in sulfide liquor is first clarified, as by filtration, under conditions that permit the removal of undesirable impurities, such as small amounts of silica, tellurium, iron and other metals, such as copper, that are present in finely divided state, or finely divided colloidal compounds, such as iron and copper sulfides. The unclarified solution gives pigments which are somewhat duller and darker than pigments prepared from clarified solutions, due probably to the effect of such impurities. It is necessary that the solution of selenium in the sulfide liquor be filtered, or clarified, when it is at definite concentrations and temperatures and when it is freshly made; otherwise the maximum amounts of the impurities will not be removed, and some of the dissolved selenium will separate out of the solution, and the efficiency of the filtration, or clarification, will not be at a maximum. In order that this clarification may be carried out properly, we have found that the solution of selenium should be made in a barium sulfide liquor of a concentration between 16° Baumé and 20° Baumé. Lower concentrations of sulfide liquor allow selenium to separate out of the solution in small amounts, while with higher concentrations iron and copper cannot be removed as effectively. The final solutions, after the selenium is added, will vary in concentration between 18 and 28 degrees Baumé, depending on the depth of shade desired, which controls the ratio of selenium added. We have also found that the solution should be filtered within 24 hours after making, otherwise the dissolved selenium will separate out of solution in small amounts, to impair the efficiency of the operation involving the use of the dissolved selenium in sulfide liquor. We have found also that this solution should be filtered, or clarified, while above 100° F. and below 190° F., otherwise some of the selenium may separate out of solution, probably combined with some of the sulfides of the metals that are present.

We have further discovered that the tinting strength of our improved pigment can be increased by 10–15% over pigments prepared by older methods, by conducting the calcination in an inert or reducing atmosphere. Nitrogen, carbon dioxide, clean flue gas, etc. may all be used; the exclusion of oxygen is the important consideration. We do not know the mechanism of the increase of tinting strength, unless the oxygen reacts with and extracts selenium or sulfur. The calcination should be conducted at temperatures ranging from 500–700° C. Rising calcination temperatures cause darkening of color, and loss of tinting strength, both disadvantageous to the desired pigment properties.

In a preferred form of our invention, we prepare 266 gallons of a cadmium sulfate solution, containing a total of 1475 pounds of cadmium sulfate, at pH 4–5. In a separate tank, we dissolve 200 pounds of selenium in 500 gallons of a 17° Baumé barium sulfide solution (containing approximately 200 grams BaS per liter). This solution, which is of about 23.5 degrees Baumé after the addition of the selenium, is carefully filtered through a fine cloth, maintaining the temperature at about 150° F. The filtered solution is then added to the cadmium sulfate solution. The precipitation is run at pH 7.0–8.5, in order to prevent loss of cadmium (if pH is below 7.0) or loss of opacity in the pigment (if pH is above 8.5). The precipitate is settled, filtered, washed, and dried. The dried precipitate is then loaded into a furnace, in which a nonoxidizing atmosphere is maintained by the use of scrubbed flue gas. The temperature is raised to 550°–600° C., and maintained for about thirty minutes. The calcined pigment is dumped into water, wet ground, filtered, dried and pulverized.

A direct comparison of pigment made by this method—one calcined in inert gas, one in the presence of air—showed the tinting strength of the first pigment to be 15% above that of the second.

Where the clarification of the sulfo-selenide solution is omitted, the color is somewhat muddier, darker and less bright. As outlined above, this step should be carried out under carefully controlled conditions, to insure maximum separation of impurities and minimum loss of selenium.

The calcination step is of course applicable to cadmium sulfo-selenide pigments, pure or compounded, no matter how precipitated.

By the use of our improved method a brighter pigment of improved tinting strength may be obtained, as compared with the pigments heretofore available.

We claim:

1. The method of making cadmium sulfo-selenide red which comprises preparing a crude uncalcined pigment, and calcining the crude pigment in a non-oxidizing atmosphere at 500 to 700° C., whereby a pigment is produced of improved tinting strength.

2. The method of making cadmium-selenide red which comprises dissolving selenium in a solution of soluble sulfide to produce a solution of 18–28° Baumé, separating the impurities from said selenium solution within 24 hours after the solution is prepared at a temperature of 100° to 190° F., precipitating crude pigment by adding a cadmium salt solution to the clarified selenium solution, and calcining the crude pigment.

3. The process of claim 2 in which the calcining is carried out under non-oxidizing conditions and at a temperature of 500° C. to 700° C.

4. The process of claim 2 in which the soluble sulfide is barium sulfide.

5. The process of claim 2 in which the soluble sulfide is sodium sulfide.

6. The process of claim 2 in which the precipitation is carried out between a pH of 7.0 and a pH of 8.5.

7. The method of making cadmium-selenide red which comprises dissolving selenium in a solution of a soluble sulfide of approximately 16 degrees to 20 degrees Baumé in an amount sufficient to produce a solution of approximately 18 degrees to 28 degrees Baumé, separating the impurities from said selenium solution within 24 hours after the solution is prepared at a temperature of 100 degrees to 190 degrees Fahrenheit, precipitating crude pigment by adding a cadmium salt solution to the clarified solution, and calcining the crude pigment.

8. In the process of preparing a cadmium sulfo-selenide red the steps which comprise dissolving selenium in a solution of soluble sulfide in amount to produce a solution of 18 degrees to 28 degrees Baumé, separating the impurities from said selenium solution within 24 hours after said solution is prepared at a temperature of 100 degrees to 190 degrees Fahrenheit and precipitating the crude pigment by adding a cadmium salt solution to the clarified selenium solution.

JAMES J. O'BRIEN.
GORDON M. JUREDINE.